(12) United States Patent
Lee (10) Patent No.: US 8,750,658 B2
(45) Date of Patent: Jun. 10, 2014

(54) OPTICAL COUPLING MODULE AND METHOD FOR MANUFACTURING THE SAME

(75) Inventor: Bing-Heng Lee, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 168 days.

(21) Appl. No.: 13/458,407

(22) Filed: Apr. 27, 2012

(65) Prior Publication Data
US 2013/0156372 A1 Jun. 20, 2013

(30) Foreign Application Priority Data
Dec. 14, 2011 (TW) .............................. 100146346 A (51) Int. Cl.
*G02B 6/42* (2006.01)
(52) U.S. Cl.
USPC .................. 385/31; 385/14; 385/15; 385/27; 385/39; 385/123
(58) Field of Classification Search
USPC ............. 385/14, 15, 27, 31, 39, 123
See application file for complete search history.

(56) References Cited

U.S. PATENT DOCUMENTS 7,306,689 B2 * 12/2007 Okubora et al. ............... 156/239
7,627,204 B1 * 12/2009 Deane ............................. 385/14

* cited by examiner

*Primary Examiner* — Jennifer Doan
(74) *Attorney, Agent, or Firm* — Novak Druce Connolly Bove + Quigg LLP (57) ABSTRACT

An optical coupling module includes a substrate, a circuit board defining two through holes, an optical waveguide positioned between the substrate and the circuit board, and an optical assembly. The optical waveguide includes a core and a clad, each core comprises two coupling surfaces corresponding to the two through holes. At least one coupling surfaces is in an arcuate shape. The clad covers the core, except for the two coupling surfaces exposing out of the clad. The optical assembly formed on the circuit board comprises an optical emitting element and an optical receiving element. The optical emitting element and the optical receiving element are positioned above the two through holes, respectively. Light emitted from the optical emitting element enters the optical waveguide via one of the coupling surface, and leaves from another coupling surface to reach the optical receiving element. The coupling surface is capability of focusing light.

16 Claims, 7 Drawing Sheets

OPTICAL COUPLING MODULE AND METHOD FOR MANUFACTURING THE SAME

BACKGROUND

1. Technical Field

The present disclosure relates to optical coupling modules, and particularly to optical coupling modules and a method for manufacturing the optical coupling modules.

2. Description of Related Art

In optical coupling modules, the optical waveguide is positioned between a substrate and a circuit board. The optical waveguide includes a core and a clad. Two flat coupling surfaces are formed on the core. The clad covers the core entirely, except for exposing the coupling surfaces. Two through holes are formed in the circuit board corresponding to the two coupling surfaces. Optical elements are positioned on the circuit board above the through holes via the die bond process for optical coupling with the flat coupling surfaces. The coupling surfaces have certain range of incident angles of receiving light. However, during the die bond process, it is practically unavoidable that the positions of the optical elements would be deviated. As a result, this will affect the optical coupling effect.

Therefore, there is room for improvement within the art.

DETAILED DESCRIPTION

Figure 1:
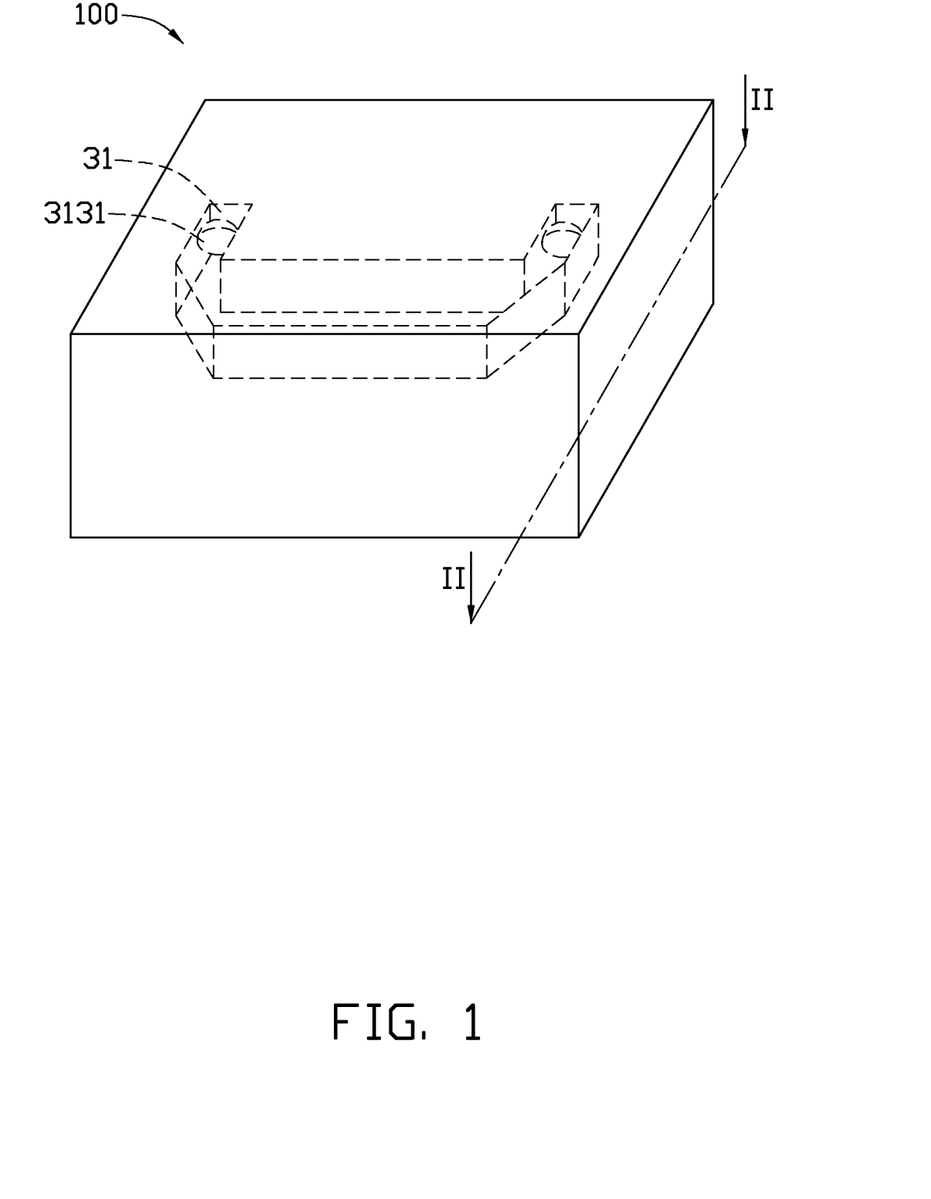
FIG. 1 is an isometric view of an optical coupling module.
Figure 2:
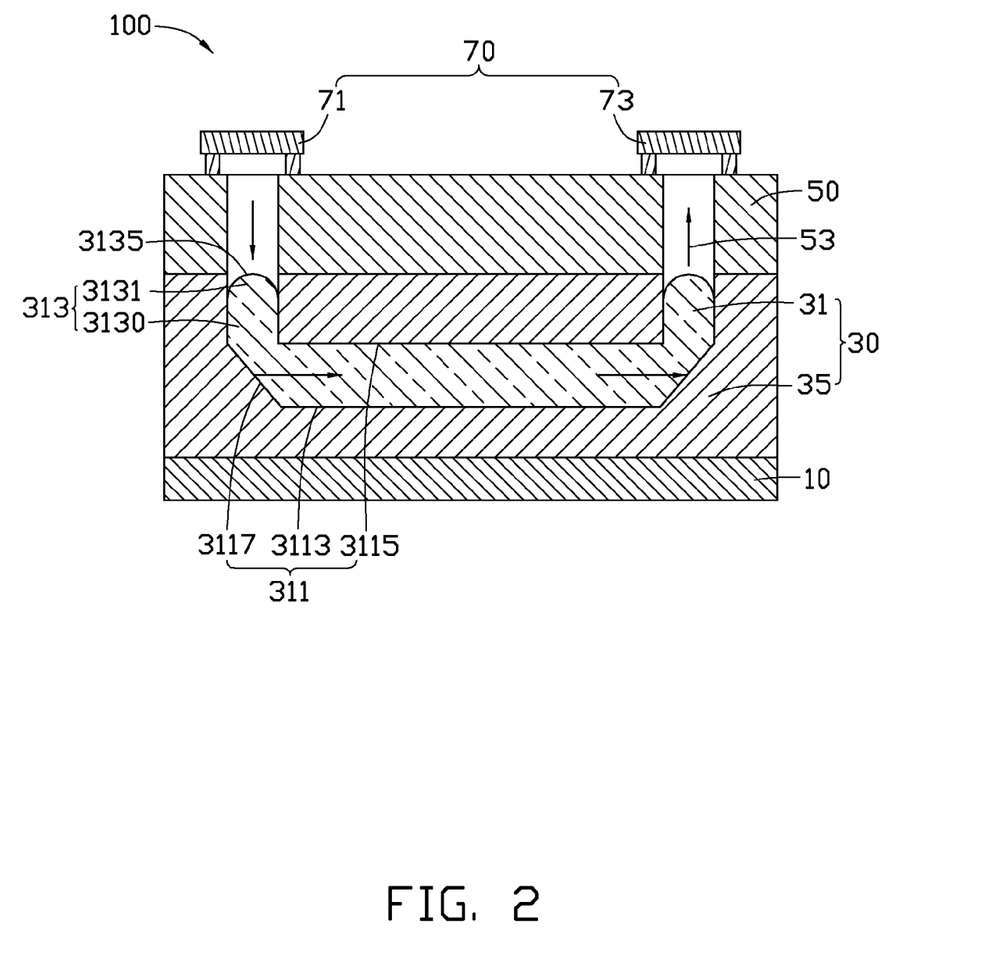
FIG. 2 is a cross-sectional view of the optical coupling module of FIG. 1, taken along a line II-II.

Referring to FIGS. 1 and 2, an optical coupling module 100 in the illustrated embodiment includes a substrate 10, an optical waveguide 30, a circuit board 50 and an optical assembly 70. The optical waveguide 30 is positioned between the substrate 10 and the circuit board 50. The optical assembly 70 is positioned on the circuit board 50 away from the optical waveguide 30.

The substrate 10 is made of insulative material, such as resin, glass, and so on. The substrate 10 can also be made of electrical conductive materials, but an outer surface of the substrate 10 needs to be covered by an insulative layer. The substrate 10 has good thermal conductivity. Circuit layout or configuration can be arranged on the substrate 10 to drive the optical assembly 70 or other functional units to work.

The optical waveguide 30 is formed on the substrate 10 for transmitting light. The optical waveguide 30 includes a core 31 and a clad 35 surrounding the core 31. The core 31 is substantially U-shaped, and including a main body 311 and two transmitting ends 313 extending from two ends of the main body 311. The main body 311 is substantially rectangular cubic. The main body 311 includes a bottom wall 3113, a top wall 3115 opposite to the bottom wall 3113, and two reflection walls 3117. The bottom wall 3113 is positioned above the substrate 10 and substantially parallel to the substrate 10. The two reflection walls 3117 obliquely extends from two ends of the bottom wall 3113 outward for changing the direction of light path.

The two transmitting ends 313 perpendicularly extend from two ends of the top wall 3115 and extend away from the substrate 10. Each transmitting end 313 includes a base body 3130 and a coupling portion 3131. Each base body 3130 is substantially rectangular, and perpendicularly formed on one end of the top wall 3115, away from the bottom wall 3113. Each coupling portion 3131 is perpendicularly formed at an end of the base body 3130 away from the main body 311. The coupling portion 3131 is a convex lens in an arcuate shape. The coupling portion 3131 includes a coupling surface 3135. In the illustrated embodiment, an inclined angle defined by the bottom wall 3113 and each reflection wall 3117 is about 135 degrees; the coupling surface 3135 is a semi-spherical structure having a largest light receiving area. In alternative embodiments, the inclined angle defined by the bottom wall 3113 and the reflection wall 3117 can be changed to other values, only requiring to satisfy the condition that light incident upon the core 31 via one coupling surface 3135 is to leave the core 31 from another coupling surface 3135. The core material is one or more transparent resins selected from the group including polyacrylic acid (PAA), polycarbonate (PC), polystyrene (PS), polymethyl methacrylate (PMMA), and methylmethacrylate and styrene (MS). In the illustrated embodiment, the core 31 is a singular monolithic body made of the same material without having any internal seams.

The clad 35 covers the core 31 entirely, except for the exposing of the coupling surfaces 3135. The clad 35 is configured for protecting the core 31 and stops light escaping and scattering from the core 31. An index of refraction of the clad material is lower than the index of refraction of the core material, so that light will be totally refracted and transmitted along a design path. In the illustrated embodiment, the clad material can be selected from one of polyacrylate, polysiloxane, polyimide, polycarbonate, and other high phototonus polymers. The clad 35 includes a first clad 351 and a second clad 355 (show in FIG. 6). The first clad 351 is sandwiched between the substrate 10 and the main body 311, to be covering the main body 311 and the reflection walls 3117. The second clad 355 covers the top wall 3115 and the two transmitting ends 313, except for exposing the coupling surfaces 3135.

The circuit board 50 is positioned on the optical waveguide 30 for installing the optical assembly 70. Two through holes 53 are formed in the circuit board 50 corresponding to the two transmitting ends 313. A diameter of each through hole 53 equals to a width of the coupling surface 3135. In the illustrated embodiment, the diameter of the through hole 53 is about 200 μm. In alternative embodiments, the diameter of the through hole 53 can be smaller or bigger than the width of the coupling surface 3135.

The optical assembly 70 is positioned on the circuit board 50 to convert light and electrical signals. The optical assembly 70 includes an optical emitting element 71 and an optical receiving element 73. The emitting element 71 and the receiving element 73 are respectively positioned on the circuit board 50 above of the two through holes 53 via the die bond process. The emitting element 71 converts the electrical signal to light signal. The receiving element 73 converts the received light signal to electrical signal. In the illustrated embodiment, the emitting element 71 is a vertical cavity surface emitting laser, and the receiving element 73 is a photo diode.

When the optical coupling module 100 is in use, the emitting element 71 coverts the electrical signal to light signal.

The emitting element 71 emits light vertically to the substrate 10. Light enters the coupling surface 3135 which is facing the emitting element 71, and then light is reflected by the reflection wall 3117 under the emitting element 71 to change transmitting direction thereof and to reach another reflection wall 3117 under the receiving element 73. Light is reflected again and emits from another coupling surface 3135 under the receiving element 73. Finally, the receiving element 73 receives the light signal and converts the light signal to corresponding electrical signal.

Figure 3A:
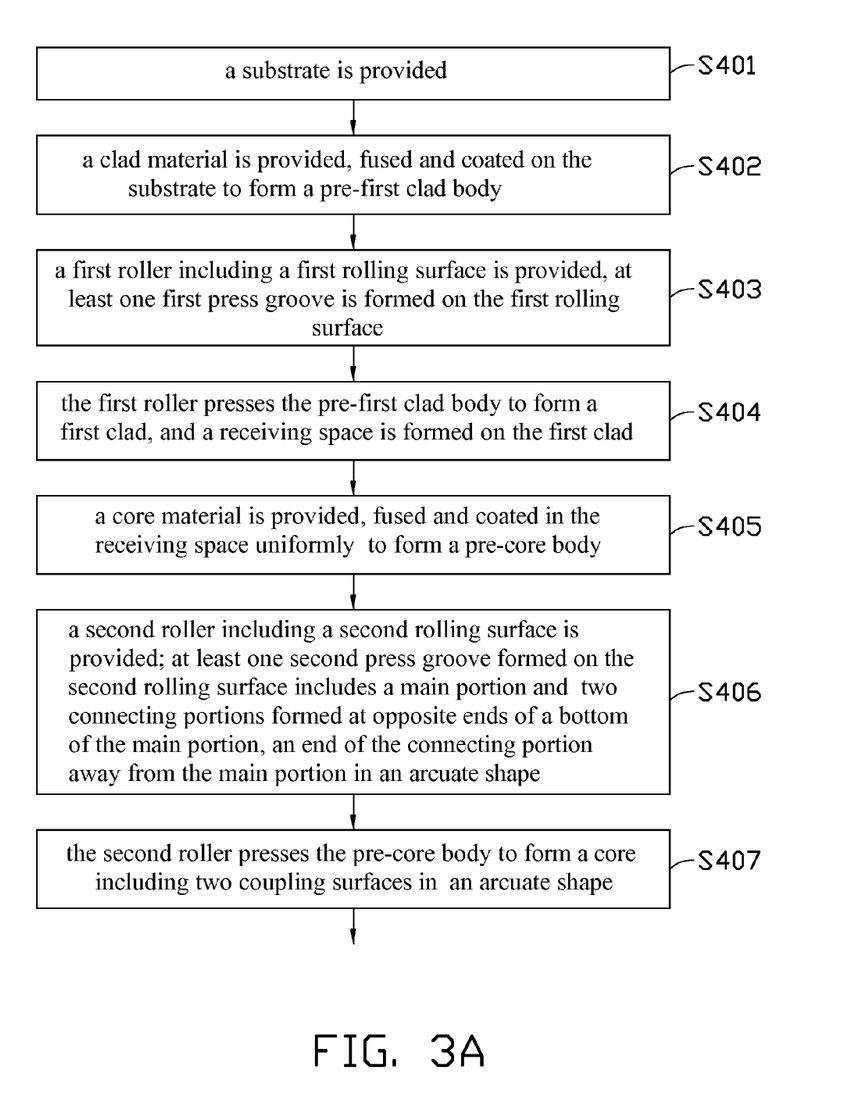
FIG. 3A and FIG. 3B are a flowchart of a method for making the optical coupling module of FIG. 1.
Figure 3B:
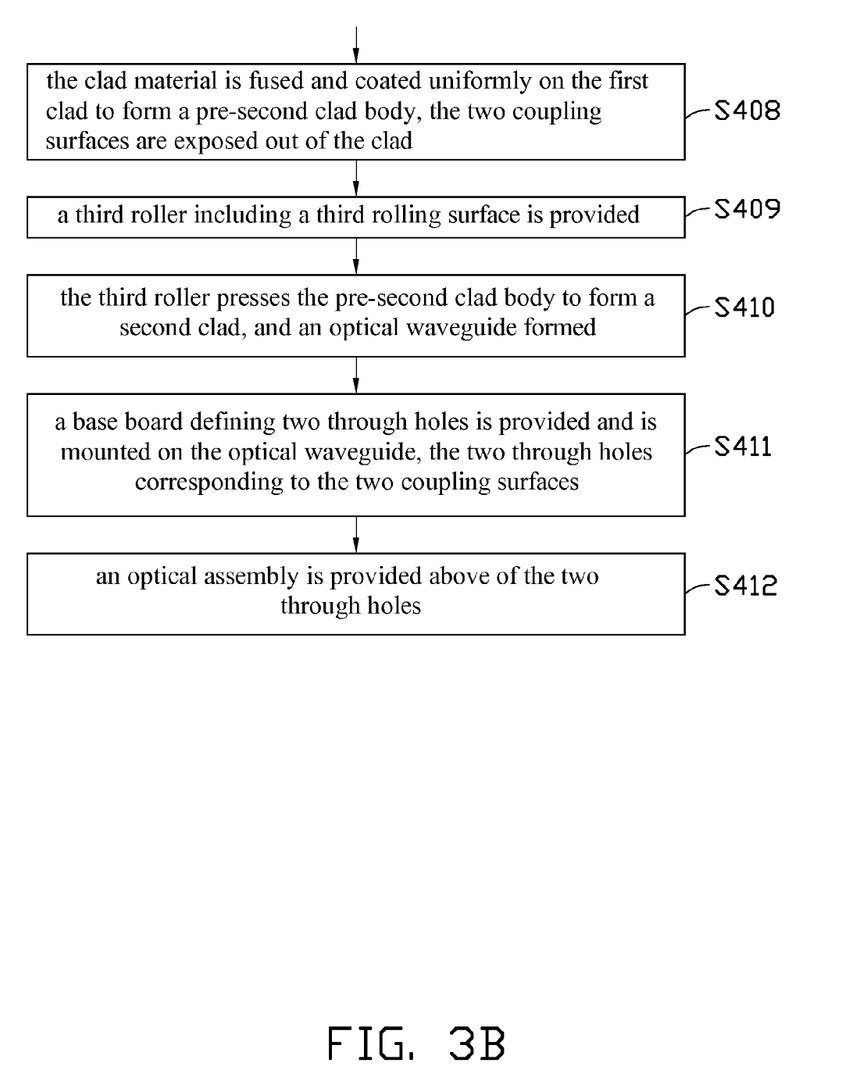

Referring to FIGS. 3A and 3B, an illustrated embodiment of the method for manufacturing the optical coupling module 100 includes the following steps.

In step S401, the substrate 10 is provided. The substrate 10 is made of an insulative material, such as resin or glass. The substrate 10 also can be made of electrical conductive material, but the surface of the substrate 10 is required to be covered by an insulation layer. The substrate 10 has good thermal conductivity. Circuit configuration can be arranged on the substrate to drive the optical assembly 70 or other functional units work.

In step S402, the clad material is provided, fused and coated uniformly on the substrate 10 to form a pre-first clad body (not shown). The clad material can be polyacrylate, polysiloxane, polyimide, polycarbonate, or other high photo-tonus polymer.

In step S403, the first roller 40 including a first rolling surface 41 (shown in FIG. 4) is provided. The first rolling surface 41 is a peripheral surface of the first roller 40. A first press groove 401 is formed on the first rolling surface 41. The first press groove 401 includes a base portion 4011 and an extending portion 4013 formed at the opposite ends of bottom of the base portion 4011. The base portion 4011 is substantially bow shaped. The extending portion 4013 is substantially rectangular and extends inward of the first roller 40.

Figure 4:
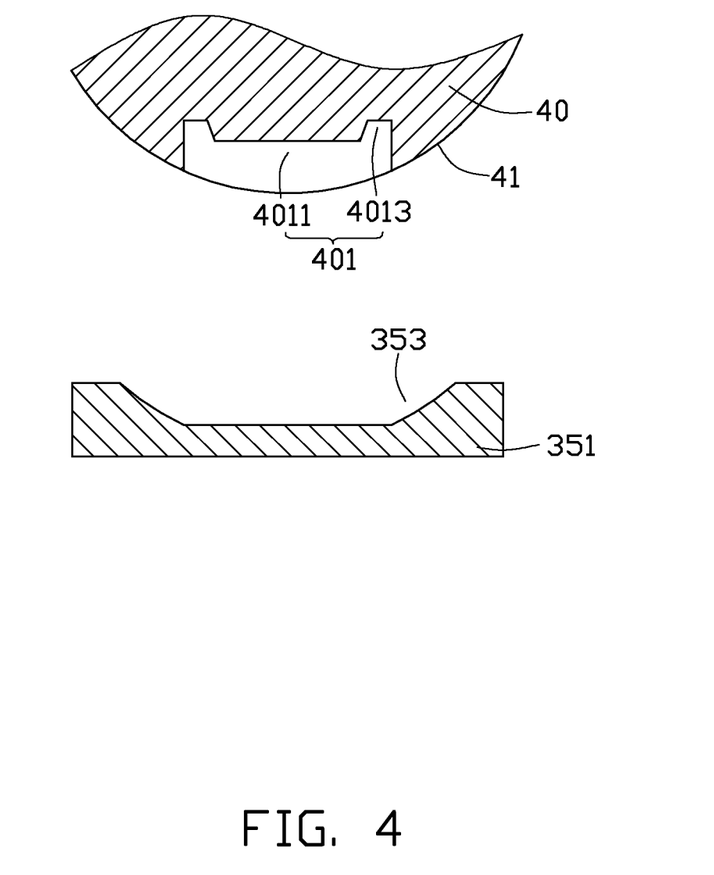
FIG. 4 is a partial cross-sectional view of a first roller and a first clad made by the first roller.

In step S404, the first roller 40 presses the pre-first clad body to form the first clad 351. A receiving space 353 is formed on the first clad 351 corresponding to the first press groove 401. The receiving space 353 is substantially sloped. The included angle between the bottom wall and the side wall of the receiving space 353 is about 135 degree.

In step S405, the core material is provided, fused and coated uniformly in the receiving space 353 to form a pre-core body (not shown). The core material is one or more transparent resins selected from the group including PAA, PC, PS, PMMA, and MS. In the illustrated embodiment, the core 31 is a single monolithic body made of the same material without any internal seams.

In step S406, a second roller 60 including a second rolling surface 61 (shown in FIG. 5) is provided. The second rolling surface 61 is a peripheral surface of the second roller 60. A second press grooves 601 is formed on the second rolling surface 61. The second press groove 601 includes a main portion 6011 and two connecting portions 6013 formed at opposite ends of the bottom of the main portion 6011. The main portion 6011 is substantially bow shaped. An end of the connecting portion 6013 away from the main portion 6011 is substantially convex lens shaped. In the illustrated embodiment, the end of the connecting portion 6013 is half spherical-shaped.

Figure 5:
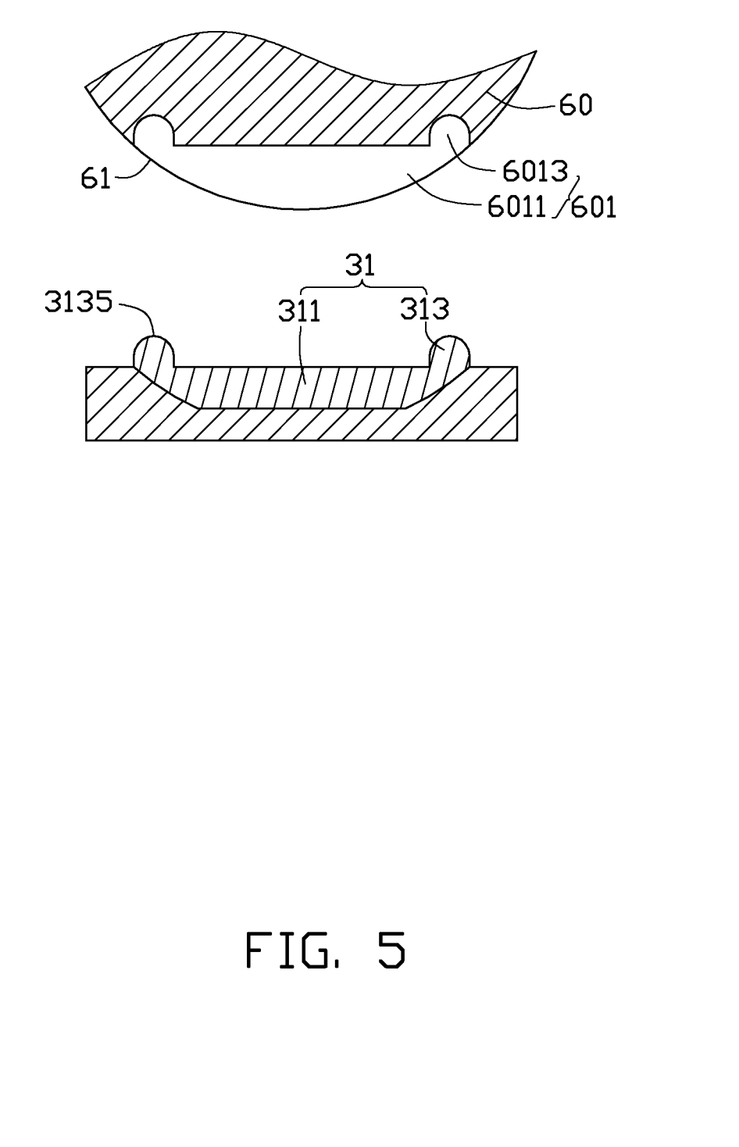
FIG. 5 is a partial cross-sectional view of a second roller and a core made on the first clad by the second roller.

In step S407, the second roller 60 presses the pre-core body to form a core 31. A cross section of the core 31 is U-shaped, including a main body 311 and two transmitting ends 313 extending from two ends of the main body 311. The main body 311 includes a bottom wall 3113, a top wall 3115, and two reflection walls 3117. The inclined angle defined by the bottom wall 3113 and the reflection wall 3117 is about 135 degrees. The coupling portion 3131 is formed at an end of the base body 3130 away from the main body 311. The coupling portion 3131 is arc shaped, and includes a coupling surface 3135 located away from the main body 311. The coupling surface 3135 a semi-spherical surface structure for having the largest light receiving area.

In step S408, the clad material is fused, and coated uniformly on the first clad 351 to form a pre-second clad body (not shown). The coupling surface 3135 is being exposed out of the pre-second clad body.

In step S409, a third roller 80 having a smooth third rolling surface 81 (shown in FIG. 6) is provided. The third rolling surface 81 is a peripheral surface of the third roller 80.

Figure 6:
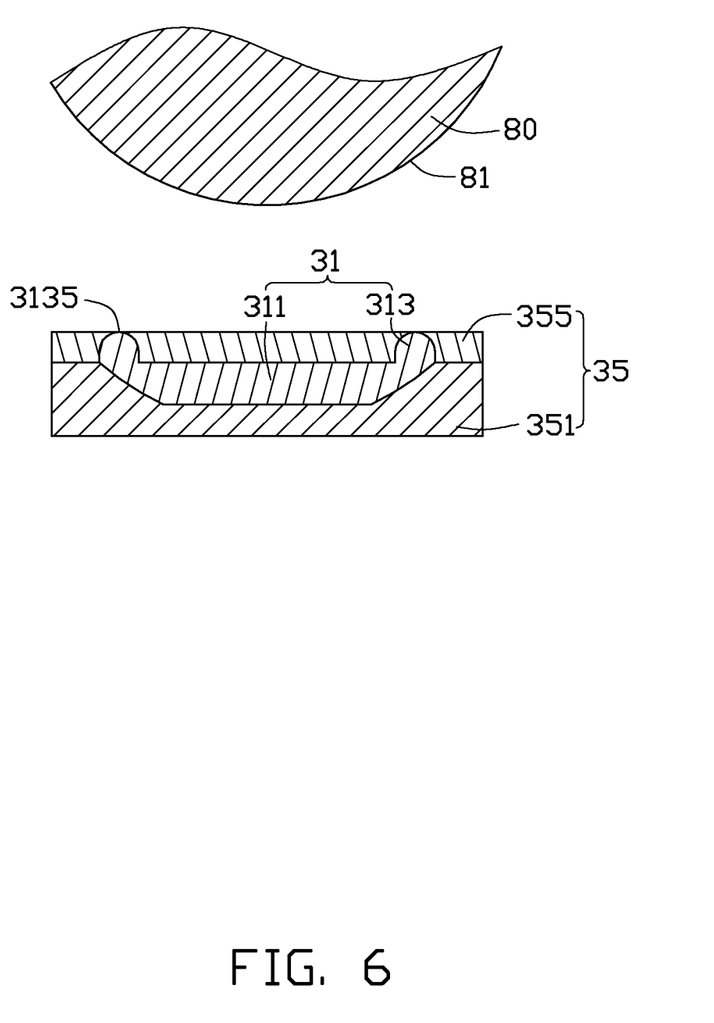
FIG. 6 is a partial cross-sectional view of a third roller and an optical waveguide made by the third roller.

In step S410, the third roller 80 presses the pre-second clad body to form a second clad 355. Then the optical wave guide 30 is formed.

In step S411, a circuit board 50 with two through holes 53 is provided. The circuit board 50 is positioned on the optical waveguide 30. The through holes 53 are configured corresponding to the two coupling surfaces 3135, respectively.

In step S412, an optical assembly 70 is provided, including an optical emitting element 71 and an optical receiving element 73. The emitting element 71 and the receiving element 73 are positioned above of the two through holes 53, respectively, via the die bonding process. Then an optical coupling module 100 is formed.

In alternative embodiments, the number of the first, second press grooves 401, 601 can be two, or three and more.

The coupling surface 3135 is a convex lens-shaped structure. Compared with the traditional flat coupling surface of optical coupling module, the convex lens-shaped coupling surfaces 3135 increases the light receiving area, decreasing the affect of the deviations of the positions of the optical elements during the die bond process. A light transmitting rate of the optical coupling module 100 will be improved because the light is focused by the coupling surface 3135.

It is believed that the present embodiments and their advantages will be understood from the foregoing description, and it will be apparent that various changes may be made thereto without departing from the spirit and scope of the disclosure or sacrificing all of its material advantages.

What is claimed is:

1. An optical coupling module, comprising:
   a substrate;
   a circuit board defining two through holes;
   an optical waveguide positioned between the substrate and the circuit board, the optical waveguide comprising:
      a core comprising:
         two coupling surfaces corresponding to the two through holes, at least one coupling surface in an arcuate shape;
      a clad covering the core entirely except for the exposing of the two coupling surfaces; and
   an optical assembly formed on the circuit board, comprising:
      an optical emitting element positioned above one through hole; and
      an optical receiving element positioned above another through hole;
   wherein light emitted from the optical emitting element entering the optical waveguide via one of the coupling surface under the optical emitting element, and leaving from another coupling surface to reach the optical receiving element; the at least one coupling surface is capability of focusing light.

2. The optical coupling module of claim 1, wherein the two coupling surfaces are a plurality of semi-spherical structures.

3. The optical coupling module of claim 1, wherein the core comprises a main body and two transmitting ends extending from the main body and extending away from the substrate, two end surfaces of the two transmitting ends away from the main body are the coupling surfaces, the clad covers the main body and the two transmitting ends.

4. The optical coupling module of claim 3, wherein the main body comprises a bottom wall positioned on the substrate, a top wall opposite to the bottom wall, and two reflection walls extending from two ends of the bottom wall away from the substrate, the clad covers the bottom wall, the top wall and the two reflection walls.

5. The optical coupling module of claim 4, wherein the clad comprises a first clad and a second clad connecting the first clad, the first clad is sandwiched between the substrate and the main body, and the second clad covers the top wall and the two transmitting ends.

6. The optical coupling module of claim 3, wherein an inclined angle between the bottom wall and each reflection wall is 135 degrees.

7. The optical coupling module of claim 3, wherein each transmitting end comprises a base body connected with the main body and a coupling portion connected with the base body, a cross section of the base body is rectangular, and the coupling portion is away from the main body and comprising the coupling surface.

8. The optical coupling module of claim 1, wherein the diameter of each through hole is 200 μm.

9. The optical coupling module of claim 1, wherein an index of refraction of the clad material is lower than an index of refraction of the core material.

10. A method of manufacturing an optical coupling module, comprising:
providing a substrate;
providing a clad material, fusing and coating the clad material on the substrate to form a pre-first clad body;
providing a first roller comprising a first rolling surface, and at least one first press groove formed on the first rolling surface;
pressing the pre-first clad body to form a first clad by using the first roller, and forming a receiving space on the first clad;
providing a core material, fusing and coating the core material in the receiving space to form a pre-core body;
providing a second roller comprising a second rolling surface, and at least one of second press groove formed on the second rolling surface, the second press groove comprising:
  a main portion; and
  two connecting portions formed at opposite ends of a bottom of the main portion, at least one end of each connecting portion away from the main portion is in an arcuate shape;
pressing the pre-core body to form a core by using the second roller, the core comprising two coupling surfaces, at least one coupling surface in an arcuate shape corresponding to the at least one end of each connecting portion in an arcuate shape;
fusing the clad material and coating the clad material uniformly on the first clad to form a pre-second clad body, the two coupling surfaces exposed out of the clad;
providing a third roller comprising a third rolling surface;
pressing the pre-second clad body by using the third roller to form a second clad and an optical waveguide is formed;
providing a circuit board defining two through holes, the circuit board mounted on the optical waveguide, the two through holes are corresponding to the two coupling surfaces;
providing an optical assembly on the circuit board, the optical assembly comprising:
  an optical emitting element positioned above one through hole; and
  an optical receiving element positioned above another through hole.

11. The manufacturing method of claim 10, wherein the two coupling surfaces are a plurality of semi-spherical structures.

12. The manufacturing method of claim 10, wherein an included angle between the bottom wall and each side wall of the receiving space is 135 degrees.

13. The manufacturing method of claim 10, wherein the core material is one or more transparent resins selected from the group consisting of polyacrylic acid (PAA), polycarbonate (PC), polystyrene (PS), polymethyl methacrylate (PMMA), and methylmethacrylate and styrene (MS).

14. The manufacturing method of claim 10, wherein the clad material is Polyacrylate, Polysiloxane, Polyimide, or Polycarbonate.

15. The manufacturing method of claim 10, wherein the diameter of each through hole is 200 μm.

16. The optical coupling module making method of claim 10, wherein an index of refraction of the clad material is lower than an index of refraction of the core material.

* * * * *